United States Patent
Park et al.

(10) Patent No.: US 10,260,610 B2
(45) Date of Patent: Apr. 16, 2019

(54) TORQUE CONVERTER FOR A VEHICLE

(71) Applicant: HYUNDAI MOTOR COMPANY, Seoul (KR)

(72) Inventors: Jin Mo Park, Gwacheon-si (KR); Pan Seok We, Hwaseong-si (KR); Ho Jin Ji, Anyang-si (KR); Myoung Chul Lee, Bucheon-si (KR); Young Seok Son, Seoul (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 15/373,259

(22) Filed: Dec. 8, 2016

(65) Prior Publication Data

US 2018/0112757 A1 Apr. 26, 2018

(30) Foreign Application Priority Data

Oct. 24, 2016 (KR) .................. 10-2016-0138714

(51) Int. Cl.
| | |
|---|---|
| *F16H 45/02* | (2006.01) |
| *F16D 13/40* | (2006.01) |
| *F16F 15/123* | (2006.01) |
| *F16D 25/0638* | (2006.01) |

(52) U.S. Cl.
CPC ............ *F16H 45/02* (2013.01); *F16D 13/40* (2013.01); *F16D 25/0638* (2013.01); *F16F 15/12353* (2013.01); *F16H 2045/0226* (2013.01); *F16H 2045/0252* (2013.01); *F16H 2045/0294* (2013.01)

(58) Field of Classification Search
CPC ............... F16H 45/02; F16H 2045/021; F16H 2045/0221; F16H 2045/0226; F16H 2045/0231; F16H 2045/0273; F16H 2045/0284; F16H 2045/0294; F16F 15/12353

See application file for complete search history.

(56) References Cited

U.S. PATENT DOCUMENTS

| | | |
|---|---|---|
| 4,694,941 A | 9/1987 | Hall et al. |
| 5,477,950 A | 12/1995 | Maloof |
| 6,244,401 B1 * | 6/2001 | Maienschein ........... F16H 45/02 |
| | | 192/213.1 |

(Continued)

FOREIGN PATENT DOCUMENTS

| | | |
|---|---|---|
| JP | 2007113660 | 5/2007 |
| KR | 20120085889 | 8/2012 |
| KR | 101377253 | 3/2014 |

*Primary Examiner* — David R Morris
(74) *Attorney, Agent, or Firm* — Lempia Summerfield Katz LLC

(57) ABSTRACT

A torque converter for a vehicle includes a front cover, an impeller configured to rotate and being coupled to the front cover, a turbine disposed to face the impeller, a turbine shell provided in the turbine, a stator disposed between the impeller and the turbine, and a lockup clutch provided with a drive hub connected to the front cover. The lock-up clutch has a drive disc provided in the drive hub, a driven disc coaxially disposed to the drive disc, and a driven hub provided with the driven disc, and a torsional damper comprising a retaining plate disposed between the lock-up clutch and the turbine. Engine torque is transmitted to the retaining plate through the front cover by a frictional contact between the drive disc and the driven disc.

13 Claims, 2 Drawing Sheets

(56) References Cited

U.S. PATENT DOCUMENTS

| | | | | |
|---|---|---|---|---|
| 6,289,674 B1* | 9/2001 | Halene | F16H 41/26 | |
| | | | 60/361 | |
| 6,439,361 B2* | 8/2002 | Maienschein | F16H 45/02 | |
| | | | 192/213.1 | |
| 6,695,110 B2* | 2/2004 | Maienschein | F16H 45/02 | |
| | | | 192/213.1 | |
| 7,984,800 B2* | 7/2011 | Frey | F16H 45/02 | |
| | | | 192/113.5 | |
| 8,042,666 B2* | 10/2011 | Frey | F16H 45/02 | |
| | | | 192/110 B | |
| 9,010,508 B2* | 4/2015 | Tanaka | F16H 45/02 | |
| | | | 192/213.1 | |
| 9,027,724 B2* | 5/2015 | Tanaka | F16H 45/02 | |
| | | | 192/3.3 | |
| 9,182,025 B2* | 11/2015 | Strong | F16H 45/02 | |
| 9,316,265 B2* | 4/2016 | Saiga | F16D 3/12 | |
| 9,702,445 B2* | 7/2017 | Kawahara | F16H 45/02 | |
| 2001/0008198 A1* | 7/2001 | Maienschein | F16H 45/02 | |
| | | | 192/3.29 | |
| 2002/0125093 A1* | 9/2002 | Maienschein | F16H 45/02 | |
| | | | 192/3.3 | |
| 2008/0236974 A1* | 10/2008 | Frey | F16H 45/02 | |
| | | | 192/3.29 | |
| 2008/0236975 A1* | 10/2008 | Frey | F16H 45/02 | |
| | | | 192/3.29 | |
| 2008/0257674 A1* | 10/2008 | Sasse | F16H 45/02 | |
| | | | 192/3.29 | |
| 2008/0257675 A1* | 10/2008 | Sasse | F16H 45/02 | |
| | | | 192/3.29 | |
| 2012/0247901 A1 | 10/2012 | Kawahara | | |
| 2013/0291528 A1 | 11/2013 | Strong et al. | | |
| 2013/0306426 A1* | 11/2013 | Tanaka | F16H 45/02 | |
| | | | 192/66.3 | |
| 2014/0027231 A1* | 1/2014 | Tanaka | F16H 45/02 | |
| | | | 192/3.29 | |
| 2014/0291098 A1* | 10/2014 | Saiga | F16D 3/12 | |
| | | | 192/3.28 | |
| 2016/0215831 A1* | 7/2016 | Ito | F16D 25/0638 | |
| 2018/0010675 A1* | 1/2018 | Park | F16F 15/12353 | |

* cited by examiner

TORQUE CONVERTER FOR A VEHICLE

CROSS-REFERENCE TO RELATED APPLICATION

This application claims the benefit of priority to Korean Patent Application No. 10-2016-0138714, filed on Oct. 24, 2016 in the Korean Intellectual Property Office, the disclosure of which is incorporated herein in its entirety by reference.

BACKGROUND

Field of the Disclosure

The present disclosure relates to a torque converter for a vehicle, and more particularly, to a torque converter for improving booming at a low speed and suppressing abnormal vibration at a high speed.

Description of the Related Art

Generally, a torque converter is installed between a vehicle engine and a transmission to transmit the driving force of the engine to the transmission through a fluid. The torque converter includes: an impeller, which receives the driving force of the engine and rotates; a turbine, which is rotated by an oil discharged from the impeller; and a stator, which increases a torque change rate by directing the flow of the oil returning to the impeller in the rotation direction of the impeller.

The torque converter is equipped with a lock-up clutch (sometimes referred to as a "damper clutch"), which is a means for directly connecting the engine to the transmission. Power transmission efficiency may be decreased if a load acting on the engine is increased. The lock-up clutch is disposed between the turbine and a front cover connected to the engine so that the rotational power of the engine may be directly transmitted to the turbine.

The use of a torque converter is typical in an automatic transmission vehicle. However, since the torque converter is a fluid device and there is always some degree of slip, a torque converter clutch may be employed to improve fuel efficiency and an operating area thereof is increasing.

Typically, when the lockup clutch is engaged at a low rpm of the engine, fuel efficiency of the vehicle is improved. However, problems with noise, vibration, and harshness, (NVH) may occur with the vehicle, such as booming. In order to improve the NVH problem due to the engagement of the lock-up clutch, it is known to reduce the rotational variation by reducing the rigidity of the torsion spring of the lock-up clutch.

In addition, there is a method of controlling the slip of the lock-up clutch in order to avoid the NVH problem that occurs when the lock-up clutch is engaged. This method, i.e., the method of controlling slip engagement of the lock-up clutch is widely used because it may reduce the fuel efficiency by reducing the slip amount in comparison with the non-engagement method. This method may solve or reduce the NVH problem of the vehicle by absorbing the rotational vibration of the engine. Furthermore, the method is advantageous from the viewpoint of operability.

Heat is generated in the torque converter slip control by friction. Thus, a multi-plate clutch having an increased heat capacity has been widely used mainly in a rear-wheel drive transmission. More recently, the multi-plate clutch is also employed in a front wheel transmission, though having many limitations on the transmission electric apparatus.

SUMMARY

The present disclosure has been made in view of the above problems, and provides a torque converter for vehicle. The disclosed torque converter can more smoothly perform a coupling operation, and thus, may effectively transmit engine torque to an input shaft of a transmission, thereby improving fuel economy and responsiveness.

In accordance with an aspect of the present disclosure, a torque converter for vehicle includes: a front cover; an impeller that rotates, the impeller being coupled to the front cover; a turbine, which is disposed to face the impeller; a turbine shell provided in the turbine; a stator disposed between the impeller and the turbine; a lockup clutch, which is provided with a drive hub connected to the front cover, a drive disc provided in the drive hub, a driven disc coaxially disposed to the drive disc, and a driven hub provided with the driven disc; and a torsional damper having a retaining plate disposed between the lock-up clutch and the turbine. Engine torque is transmitted to the retaining plate through the front cover by frictional contact of the drive disc and the driven disc.

The retaining plate may be provided with at least one first torsion spring. One end of the first torsion spring may be supported by the retaining plate and the other end of the first torsion spring may be supported by the first side plate. The first side plate may be connected to a second side plate. At least one second torsion spring may be disposed between the first side plate and the second side plate. One end of the second torsion spring may be supported by the first side plate and the second side plate. The other end of the second torsion spring may be supported by a driven plate. The driven plate may be coupled to a turbine hub together with a turbine shell.

The second side plate may support the driven hub in a radial direction. The first side plate and the second side plate may axially support the retaining plate. The turbine hub may support the second side plate in the radial direction. The driven hub and the driven plate may support the second side plate in an axial direction.

The driven plate may support the retaining plate in the radial direction.

The turbine shell may support the first side plate in the radial direction.

The turbine shell and the turbine hub may axially support the first side plate.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Embodiments of the present disclosure are described with reference to the accompanying drawings. The same reference numbers are used throughout the drawings to refer to the same or like parts. Detailed descriptions of well-known functions and structures incorporated herein may be omitted to avoid obscuring the subject matter of the present disclosure.

Figure 1:
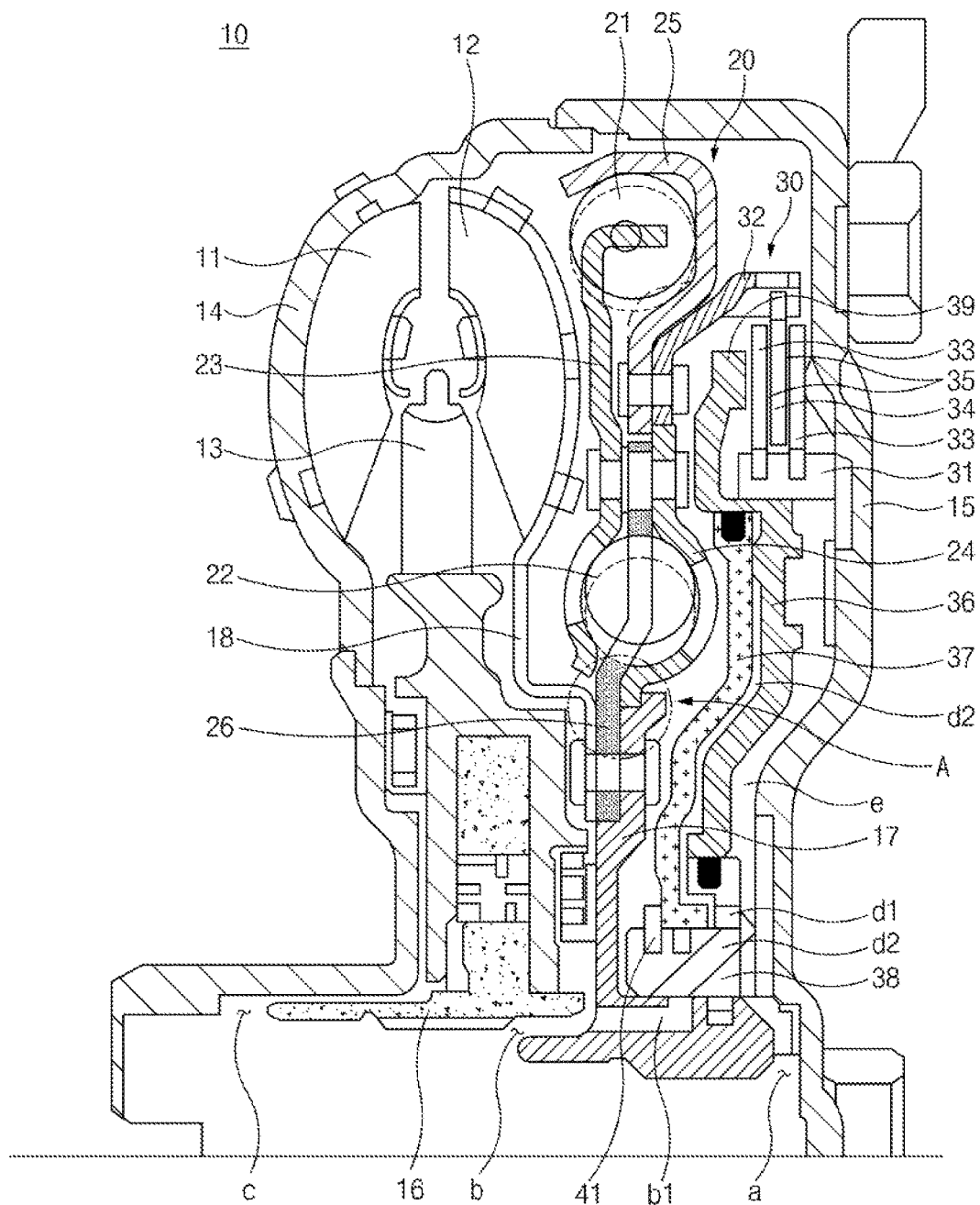
FIG. 1 is a half sectional view of a torque converter for explaining an embodiment of the present disclosure.

Referring to FIG. 1, a torque converter 10 according to various embodiments of the present disclosure may include an impeller 11. The impeller 11 receives a driving force of an engine and rotates. The torque converter 10 also may include a turbine 12, which is disposed to face the impeller 11. The torque converter 10 may further include a stator 13, which is positioned between the impeller 11 and the turbine 12. The stator 13 changes a flow of fluid discharged from the turbine 12 to transmit to the impeller 11.

The impeller 11 may be provided with an impeller shell 14. A front cover 15 may be joined in the front of the impeller shell 14 through welding or the like. The impeller shell 14 and the front cover 15 may be sealingly coupled in such a manner that the fluid therein is prevented from leaking to the outside. The front cover 15 may be connected to a crankshaft of the engine, so that the driving force of the engine may be stably transmitted to the impeller 11.

The turbine 12 may be provided with a turbine shell 18. The turbine shell 18 may be connected to a turbine hub 17 via a rivet or the like. The turbine hub 17 may be connected to an input shaft of the transmission.

The stator 13 may have the same rotation center as that of the front cover 15. A stator hub 16 may be disposed in the inner diameter of the stator 13. In addition, a lock-up clutch 30, which is for directly connecting the engine with the transmission, may be disposed between the front cover 15 and the turbine 12.

The lockup clutch 30 may include a drive hub 31 connected to the front cover 15, a drive disc 33 provided in the drive hub 31, a driven disc 34 coaxially disposed to the drive disc 33, a friction member 35 interposed between the drive disc 33 and the driven disc 34, a piston 36 operated by hydraulic pressure, and a driven hub 32 provided with the driven disc 34.

The friction member 35 may be disposed between the drive disc 33 and the driven disc 34 by being coated on or fixed to the drive disc 33 or the driven disc 34.

FIG. 1 illustrates that two drive discs 33 are axially spaced apart. The driven disc 34 is disposed between the two drive discs 33. Two friction members 35 are disposed between the driven disc 34 and the drive disc 33. The number of drive discs 33 and driven discs 34 may be appropriately increased so that two or more friction members may be provided.

The piston 36 may be movable in the axial direction. The front cover 15 may be disposed in one side (such as toward the front of the torque converter) of the piston 36. A cover plate 37 may be disposed in the other side (such as toward the rear of the torque converter) of the piston 36. A first hydraulic pressure space 'e' may be formed between the piston 36 and the front cover 15 and a second hydraulic pressure space 'd2' may be formed between the piston 36 and the cover plate 37.

The piston 36 may be moved in the axial direction by hydraulic pressure acting in the first and second hydraulic pressure spaces 'e' and 'd2'. In more detail, when the hydraulic pressure of the first hydraulic pressure space 'e' is larger than the hydraulic pressure of the second hydraulic pressure space 'd2', the piston 36 may be moved backward and be closely in contact with the cover plate 37, so that the drive discs 33 and the driven disc 34 may be in a disengaged state whereby the drive discs 33 and the driven disc 34 are separated from each other. On the other hand, when the hydraulic pressure of the second hydraulic pressure space 'd2' is larger than the hydraulic pressure of the first hydraulic pressure space 'e', the piston 36 may advance to the front cover 15 side. Thus, the drive discs 33 and the driven disc 34 may be engaged in such a manner that the drive discs 33 and the driven disc 34 may be in close contact with each other through the friction members 35. As the drive discs 33 and the driven disc 34 are engaged, the engine torque may be transmitted to the driven hub 32 through the front cover 15, the drive hub 31, the drive discs 33, and the friction members 35.

A pressing portion 39 may be provided in the outer edge of the piston 36, and the pressing portion 39 may be positioned adjacent to the drive discs 33 and the driven disc 34.

When the piston 36 is advanced toward the front cover 15 (moves toward the front side of the torque converter), the pressing portion 39 of the piston 36 may press the drive discs 33 and the driven disc 34 to the front cover 15. The drive discs 33 and the driven disc 34 may then be in frictional contact with each other through the friction members 35.

When the piston 36 is moved backward to the cover plate 37 (move backward to the rear side of torque converter), the pressing portion 39 of the piston 36 may be separated from the drive discs 33 and the driven disc 34. The drive discs 33 and the driven disc 34 may then be spaced apart.

The cover plate 37 may be disposed adjacent to one surface of the piston 36. Backward movement of the piston 36 toward a retaining plate 25 may be controlled by the cover plate 37. A piston hub 38 may be disposed at the lower end of the piston 36 and the cover plate 37.

The cover plate 37 may be welded to the piston hub 38 or supported by a snap ring 41. The piston 36 may be stopped by the cover plate 37 when the piston 36 moves backward.

A torsional damper 20 may be disposed between the lockup clutch 30 and the turbine 12. The torsional damper 20 may include a retaining plate 25 connected to the driven hub 32.

The retaining plate 25 may be coupled to the driven hub 32 through welding, rivets, or the like. The engine torque may be transmitted to the retaining plate 25 from the drive hub 31 via the driven hub 32 when the drive discs 33 and the driven disc 34 are in frictional contact with each other through the friction members 35.

A plurality of first torsion springs 21 may be mounted in the outer edge of the retaining plate 25 so as to be spaced apart in the circumferential direction.

A first side plate 23 may be disposed between the retaining plate 25 and the turbine 12. One end of each of the first torsion springs 21 may be supported by the retaining plate 25 and the other end of each of the first torsion springs 21 may be supported by the first side plate 23. Thus, the engine torque transmitted to the retaining plate 25 may be transmitted to the first side plate 23 through the first torsion springs 21.

A second side plate 24 may be coupled to the first side plate 23 through welding, rivets, or the like. A plurality of second torsion springs 22 may be mounted between the first side plate 23 and the second side plate 24 so as to be spaced apart in the circumferential direction. One end of each of the second torsion springs 22 may be supported by the first side plate 23 and the second side plate 24 and the other end of each of the second torsion springs 22 may be supported by the driven plate 26. A driven plate 26 may be disposed between the first side plate 23 and the second side plate 24. The first side plate 23 and the second side plate 24 may be coupled through welding, rivets, or the like. The engine torque transmitted to the first side plate 23 may be transmitted to the driven plate 26 side through the second torsion springs 22. The driven plate 26 may be coupled to the turbine hub 17, which transmits the engine torque to the transmission, through welding, rivets, or the like. In addition, the driven plate 26 may be coupled to the turbine hub 17 together with the turbine shell 18 through welding, rivets, or the like A certain clearance may be formed between the outer diameter of the second side plate 24 and the inner diameter of the driven hub 32, so that the second side plate 24 may support the driven hub 32 in the radial direction. A certain clearance may be formed between one surface of the retaining plate 25 and the first side plate 23 in the axial direction. A certain clearance may be formed between a part of the other surface of the retaining plate 25 and the second side plate 24 in the axial direction, so that the first side plate 23 and the second side plate 24 may support the retaining plate 25 in the axial direction.

A certain clearance may be formed between the outer diameter of the turbine hub 17 and the inner diameter of the second side plate 24, so that the turbine hub 17 may support the second side plate 24 in the radial direction. A certain clearance may be formed between a part of one surface of the second side plate 24 and the turbine hub 17 in the axial direction. A certain clearance may be formed between a part of the other surface of the second side plate 24 and the driven plate 26 in the axial direction, so that the driven plate 26 and the turbine hub 17 may support the second side plate 24 in the axial direction.

Figure 2:
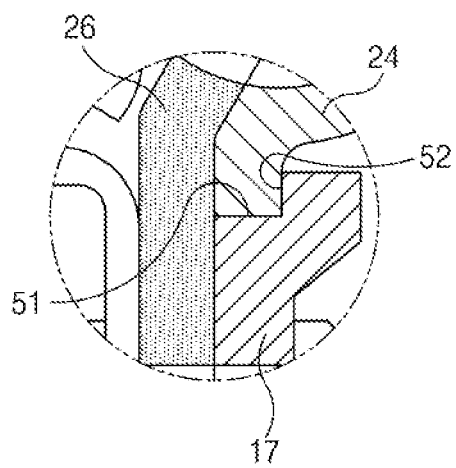
FIG. 2 is an enlarged view of a portion of the torque converter indicated by an arrow A in FIG. 1.

As shown in FIG. 2, a first support surface 51 and a second support surface 52 may be formed orthogonally in the outer edge of the turbine hub 17. A clearance may be formed between the first support surface 51 of the turbine hub 17 and the inner diameter of the second side plate 24, so that the turbine hub 17 may support the second side plate 24 in the radial direction. A certain clearance may be formed between the second support surface 52 of the turbine hub 17 and a part of one surface of the second side plate 24, so that the turbine hub 17 may support the second side plate 24 in the axial direction.

Further, instead of the second side plate 24 supporting the driven hub 32 in the radial direction, the driven plate 26 may support the retaining plate 25 in the radial direction. In such an embodiment, a certain clearance may be formed between the inner diameter of the retaining plate 25 coupled with the driven hub 32 and the outer diameter of the driven plate 26.

In addition, instead of the turbine hub 17 supporting the second side plate 24 in the radial direction, the turbine shell 18 may support the first side plate 23 in the radial direction. In such an embodiment, a certain clearance may be formed between the inner diameter of the first side plate 23 connected to the second side plate 24 and the outer diameter of the turbine shell 18.

Further, instead of the driven plate 26 supporting the second side plate 24 in the axial direction, the turbine shell 18 and the turbine hub 17 may support the first side plate 23 in the axial direction. In such an embodiment, a certain clearance may be formed between a part of one surface of the first side plate 23 and the turbine hub 17 in the axial direction. A certain clearance may be formed between a part of the other side surface of the first side plate 23 and the turbine shell 18 in the axial direction.

Hereinafter, the process of transmitting the engine torque upon coupling of the lock-up clutch 30 with respect to the torsion damper 20, configured as described above, is further described.

When the piston 36 is advanced toward the front cover 15, the drive discs 33 and the driven disc 34 may be in frictional contact with each other by the piston 36 through the friction members 35. The engine torque, which is transmitted through the front cover 15, may be transmitted to the retaining plate 25 side. The engine torque transmitted to the retaining plate 25 may be transmitted to the first side plate 23 through the first torsion springs 21. The engine torque transmitted to the first side plate 23 may further be transmitted to the driven plate 26 through the second torsion springs 22. The engine torque transmitted to the driven plate 26 may be transmitted to the turbine hub 17, so that the engine torque may be smoothly transmitted to the input shaft of the transmission.

A first inflow hole 'a' may be formed between the turbine hub 17 and the front cover 15. A second inflow hole 'b' may be formed between the turbine hub 17 and the stator hub 16. A third inflow hole 'c' may be formed between the stator hub 16 and the impeller shell 14.

According to one example, a suitable fluid, i.e., an engagement fluid for engaging the lock-up clutch 30 may be introduced into the first inflow hole 'a'. A cooling fluid for cooling the drive discs 33, the driven disc 34, and the friction members 35 of the lock-up clutch 30 may be introduced into the second and third inflow holes 'b' and 'c'.

According to another example, the engagement fluid for engaging the lock-up clutch 30 may be introduced into the second inflow hole 'b'. The cooling fluid for cooling the drive discs 33, the driven disc 34, and the friction members 35 of the lock-up clutch 30 may be introduced into the first and third inflow holes 'a' and 'c'.

When a fluid is supplied from the transmission, a plurality of grooves and holes may be provided in the piston hub 38 so as to provide appropriate hydraulic pressure to a plurality of flow paths 'd1', 'd2', 'e', depending on the role of the fluid selectively supplied to the first inflow hole 'a', to the second inflow hole 'b' and to the third inflow hole 'c'.

According to one example, when the engagement fluid is supplied to the first inflow hole 'a' and the cooling fluid is supplied to both the second inflow hole 'b' and the third inflow hole 'c', a flow path, such as a plurality of grooves, holes, and the like, may be provided to the piston hub 38 so that the first inflow hole 'a' may communicate with the second hydraulic pressure space 'd2' via the flow path 'd1'. The second inflow hole 'b' may also communicate with the first hydraulic pressure space 'e'.

According to another example, when the engagement fluid is supplied to the second inflow hole 'e' and the cooling fluid is supplied to both the first inflow hole 'a' and the third inflow hole 'c', a flow path, such as a plurality of grooves, holes, and the like, may be provided to the piston hub 38 so that the second inflow hole 'b' may communicate with the second hydraulic pressure space 'd2' via the flow path 'd1'. The first inflow hole 'a' may also communicate with the first hydraulic pressure space 'e'.

According to a torque converter damper for a vehicle of the present disclosure, the torque converter employs two or more multi-plate friction members and a separate piston. The torque converter also provides an arrangement for each component of a torsional damper, and axial and radial supporting structure, thereby improving fuel efficiency and responsiveness.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A torque converter for a vehicle, the torque converter comprising:
   a front cover;
   an impeller coupled to the front cover, the impeller configured to rotate;
   a turbine disposed to face the impeller;
   a turbine shell provided in the turbine;
   a stator disposed between the impeller and the turbine;
   a lockup clutch provided with a drive hub connected to the front cover, a drive disc provided in the drive hub, a driven disc coaxially disposed to the drive disc;
   a torsional damper including a retaining plate disposed between the lock-up clutch and the turbine;
   a first side plate disposed between the retaining plate and the turbine; and
   a second side plate coupled to the first side plate,
   wherein a driven plate is coupled to a turbine hub together with the turbine shell,
   wherein the turbine hub has a groove in which an end portion of the second side plate is fitted, the groove has a first support surface and a second support surface perpendicular to each other, the turbine hub supports the second side plate in a radial direction by the first support surface, and the turbine hub supports the second side plate in an axial direction by the second support surface, and
   wherein the torsional damper includes
      at least one first torsion spring, one end of the at least one first torsion spring being supported by the retaining plate and another end of the at least one first torsion spring being supported by the first side plate, the first side plate being connected to the second side plate; and
      at least one second torsion spring disposed between the first side plate and the second side plate, one end of the at least one second torsion spring being supported by the first side plate and the second side plate, another end of the at least one second torsion spring being supported by the driven plate.

2. The torque converter of claim 1, wherein the second side plate supports a driven hub in a radial direction, the first side plate and the second side plate axially support the retaining plate, the turbine hub supports the second side plate in the radial direction, and the driven hub and the driven plate support the second side plate in an axial direction.

3. The torque converter of claim 1, wherein the driven plate supports the retaining plate in a radial direction.

4. The torque converter of claim 3, wherein the turbine shell supports the first side plate in a radial direction.

5. The torque converter of claim 3, wherein the turbine shell and the turbine hub axially support the first side plate.

6. The torque converter of claim 1, wherein the turbine shell supports the first side plate in a radial direction.

7. The torque converter of claim 6, wherein the turbine shell and the turbine hub axially support the first side plate.

8. The torque converter of claim 1, wherein the turbine shell and the turbine hub axially support the first side plate.

9. The torque converter of claim 1, wherein the at least one first torsion spring includes a plurality of first torsion springs.

10. The torque converter of claim 9, wherein the at least one second torsion spring includes a plurality of second torsion springs.

11. The torque converter of claim 1, wherein the at least one second torsion spring includes a plurality of second torsion springs.

12. The torque converter of claim 1, wherein the drive disc comprises at least two drive discs, and wherein the driven disc is disposed between the at least two drive discs.

13. The torque converter of claim 12, further comprising a friction member between each of the at least two drive discs and the driven disc.

* * * * *